United States Patent [19]
Castaldi

[11] 3,802,580
[45] Apr. 9, 1974

[54] MEANS FOR SELECTIVELY REMOVING A PRESELECTED NUMBER OF ARTICLES FROM AN INVENTORY STORAGE MEANS

[75] Inventor: John A. Castaldi, Brooklyn, N.Y.

[73] Assignee: Supreme Equipment & Systems Corp., Brooklyn, N.Y.

[22] Filed: Feb. 22, 1973

[21] Appl. No.: 334,832

[52] U.S. Cl............................. 214/16.4 A, 221/0.5
[51] Int. Cl.............................................. B65g 1/06
[58] Field of Search ... 214/16.4 A, 16.4 B, 16.10 B, 214/16.4 R; 221/0.5, 278

[56] References Cited
UNITED STATES PATENTS

| | | | |
|---|---|---|---|
| 2,602,557 | 7/1952 | Sinclair | 214/16.1 DB |
| 2,815,133 | 12/1957 | Asheim | 214/16.1 DB |
| 2,941,738 | 6/1960 | Burke et al. | 214/16.4 A |
| 2,988,237 | 6/1961 | Devol | 214/16.4 A |
| 3,055,517 | 9/1962 | Kirkland | 214/16.1 A |
| 3,297,379 | 1/1967 | Artaud et al. | 214/16.4 A |
| 3,632,001 | 1/1972 | Richens et al. | 214/16.4 A X |
| 3,199,674 | 8/1965 | Kalthoff et al. | 221/0.5 |

Primary Examiner—G. M. Forlenza
Assistant Examiner—R. B. Johnson
Attorney, Agent, or Firm—Sandoe, Hopgood and Calimafde

[57] ABSTRACT

The invention contemplates efficient automatic retrieval of selected numbers of like articles from inventory storage, wherein inventory is accommodated in a two-dimensional matrix of storage compartments having open ends in essentially a single surface. Scanning and two-component positioning mechanism place an article-retriever and collector device in position to retrieve the desired article, unique to a particular storage compartment. The retriever is automatically driven in a cycle extending into and out of the particular compartment and includes item-engaging means operative for only a part of the retraction stroke, such that only the desired number of articles is removed in any such cycle, and such that the articles which are not retrieved from the compartment are left in a forward position in the compartment.

18 Claims, 10 Drawing Figures

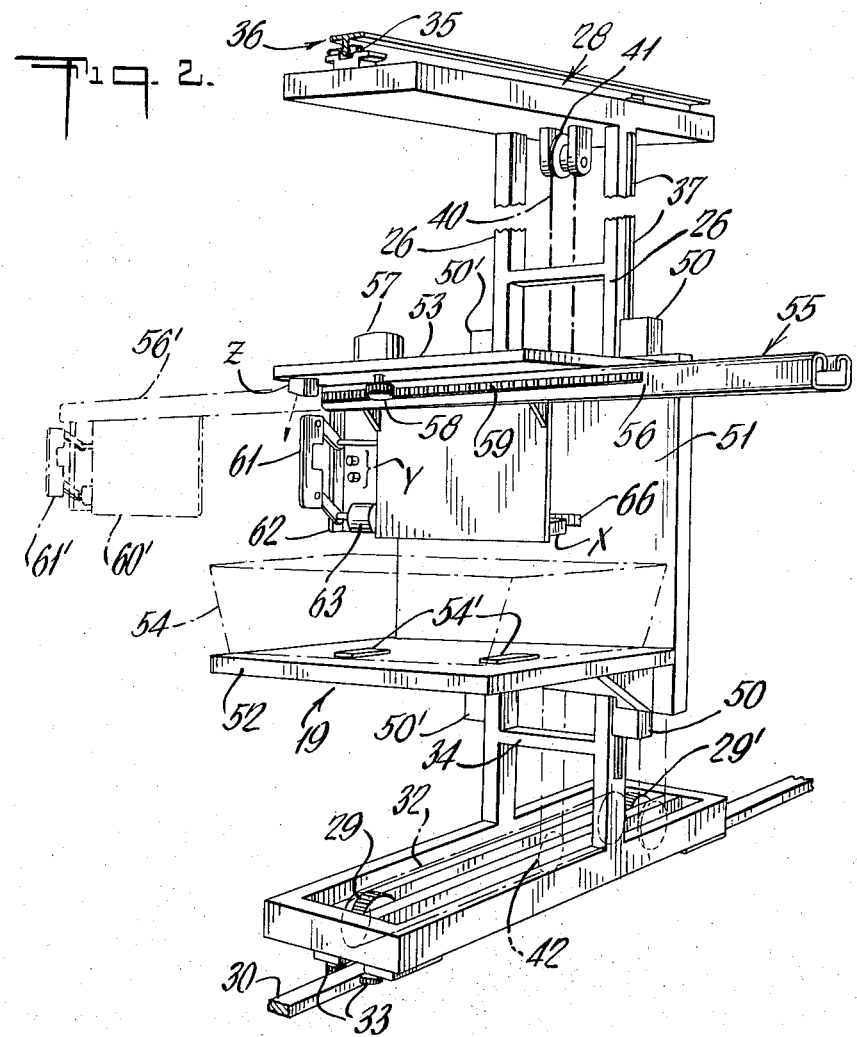
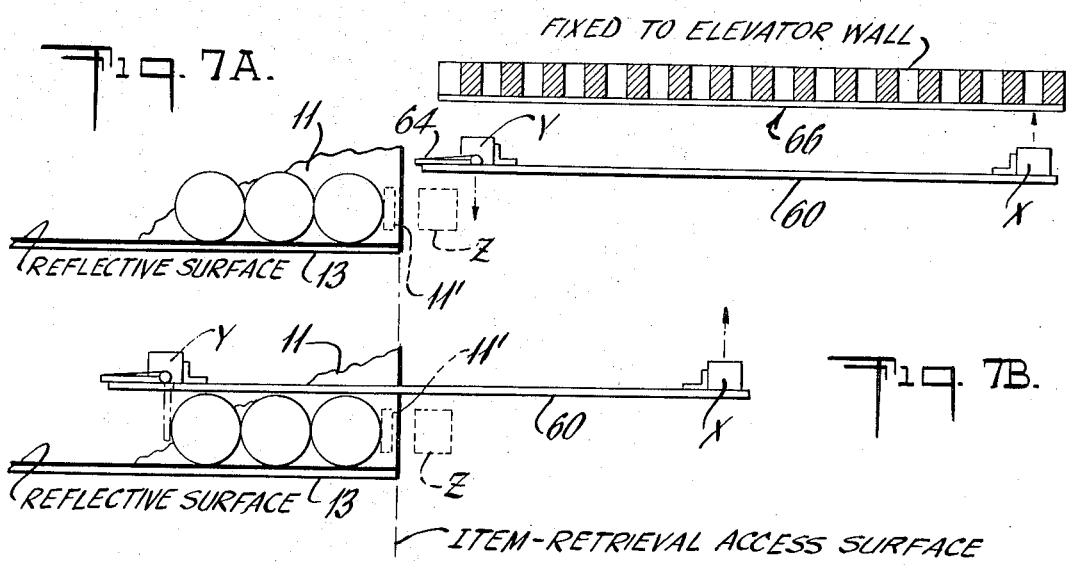

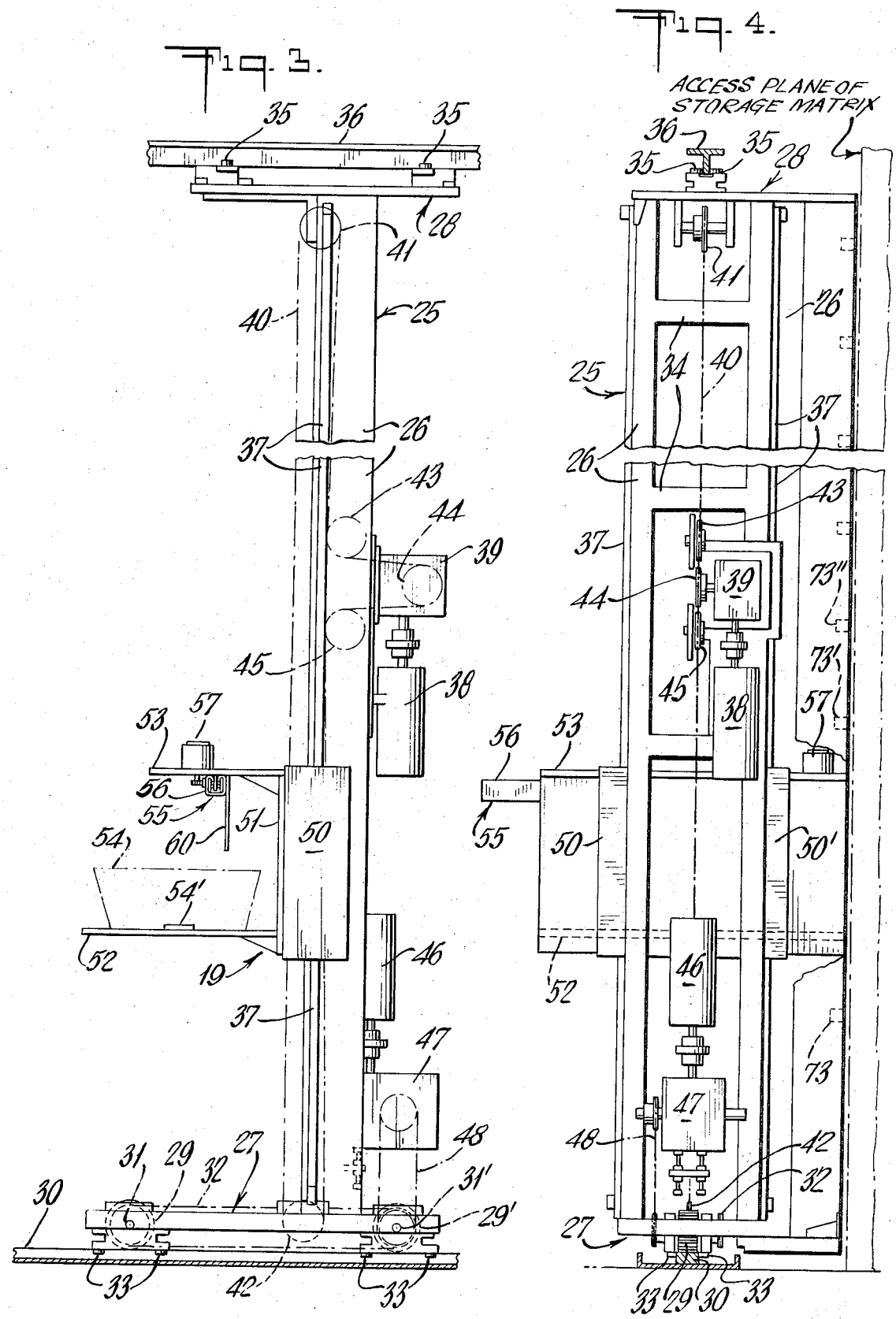

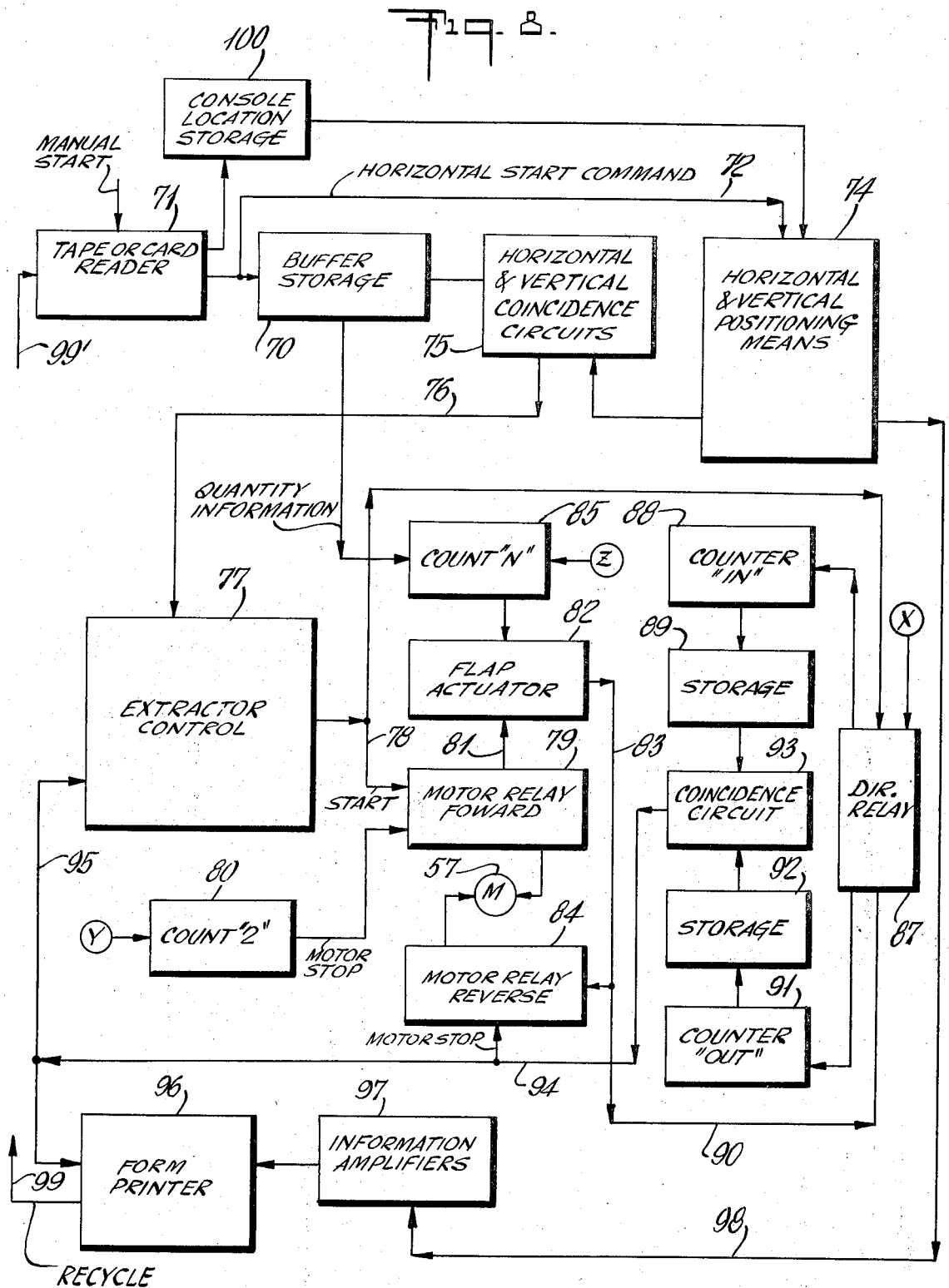

MEANS FOR SELECTIVELY REMOVING A PRESELECTED NUMBER OF ARTICLES FROM AN INVENTORY STORAGE MEANS

This invention relates to an automatic article-retrieval device wherein desired quantities of like articles and of various articles are sought out and extracted from an inventory of a large variety of stored articles. The invention relates generally to the types of storage and retrieval system exemplified by Castaldi U. S. Pat. Nos. 3,490,616, 3,526,326 and 3,595,388.

Storage and retrieval systems of the character indicated may be described as presenting an inventory of a variety of stored articles wherein pluralities of like articles are accommodated in single storage compartments, all compartments being open at a single access surface, which in the case of a two-dimensional system is generally a vertical surface. A carriage and elevator provide two-component positioning for retrieval mechanism, the latter being operative once the desired storage-compartment location has been ascertained. In past systems, item-retrieval at the selected location has involved extraction of one article for each article-extraction cycle.

It is an object of the invention to provide an improved system of the character indicated.

Another object is to provide an improved article-retrieving mechanism for such a system.

A specific object is to provide, for such a system, an article-retrieving mechanism wherein a given single cycle of article retrieval is operative to deliver from storage a desired selected number of like articles.

A further specific object is to provide such a system which flexibly lends itself to such retrieval for variously sized and shaped articles, in variously sized compartments.

Other objects and various further features of novelty and invention will be pointed out or will occur to those skilled in the art, from a reading of the following specification, in conjunction with the accompanying drawings. In said drawings, which show, for illustrative purposes only, preferred forms of the invention:

FIG. 2 is a perspective, partly broken, view of the carriage and article-extraction means, forming part of the system of FIG. 1;

FIGS. 3 and 4 are, respectively, partly broken front and side views in elevation, of the carriage of FIG. 2;

FIGS. 7A and 7B are simplified diagrams to illustrate different parts of a typical cycle of article-extraction; and FIG. 8 is an electrical circuit diagram, schematically illustrating automatic-control of the system of FIG. 1.

Figure 1:
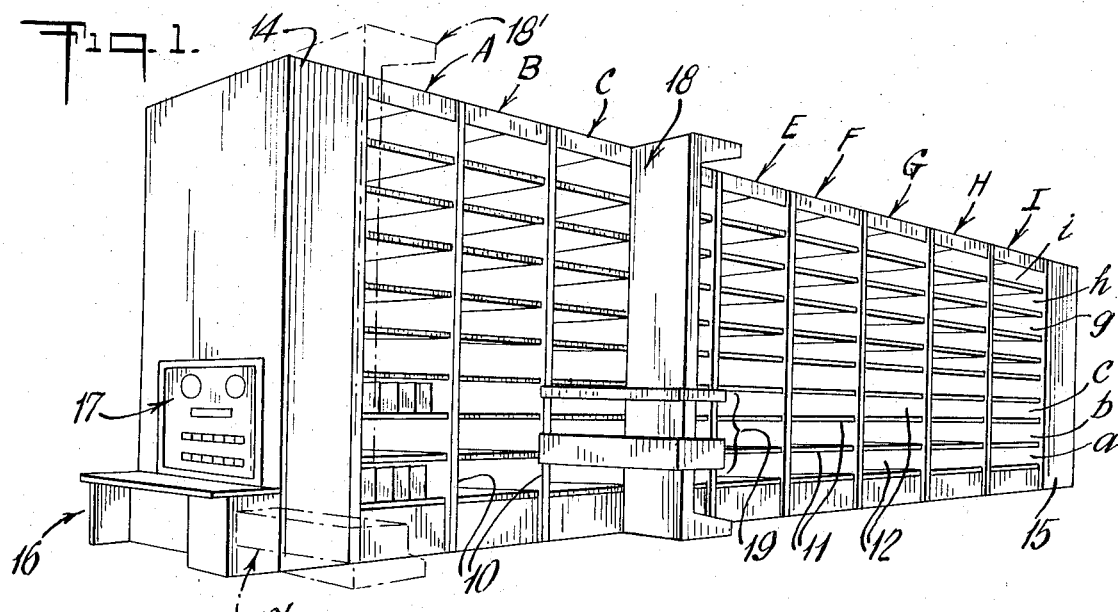
FIG. 1 is a simplified overall perspective view of a search and retrieval system of the invention.
Figure 1A:
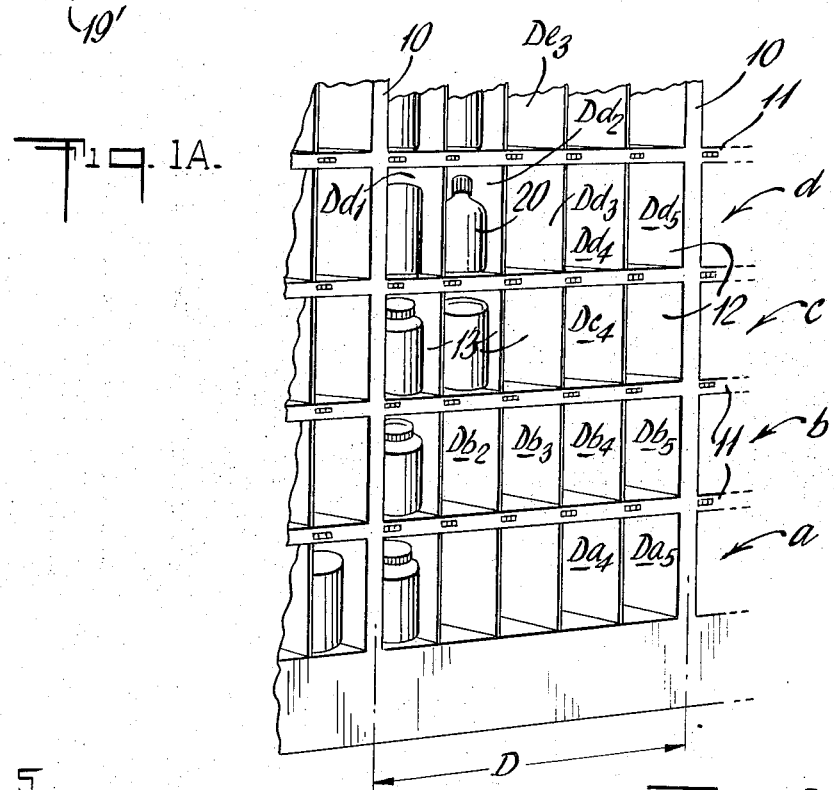
FIG. 1A is an enlarged fragmentary perspective view, to show open ends of some of the storage compartments served by mechanism of the invention.

The invention is shown in application to an inventory system for plural quantities of a variety of articles, such as packaged pharmaceutical items. The system uses a two-dimensional matrix of storage compartments presenting open retrieval-access ends in a common vertical surface. A framework of columns 10, shelves 11, and divider panels 12 defines the storage compartments, shown in FIG. 1 to comprise major shelf spaces in each of nine horizontally adjacent vertical stacks A, B, C......I, and at each of nine shelf levels $a, b, c......i$. Depending upon the width dimension of articles to be extracted from storage, the major shelf spaces may be further subdivided by partition walls 13; in FIG. 1A, the vertical stack D between columns 10 and divider walls 12 is further subdivided by partitions 13 into five like storage compartments, at each of the levels $a, b, c$, etc.

End housings 14–15 provide enclosures for control mechanism and maintenance or other articles not involved in the inventory storage, and a master desk console 16 and control input station 17 assist a single operator in supervising operation of the machine. A horizontally travelling carriage 18 with vertical-elevator means 19, rides a horizontal guide system (not shown in FIG. 1) and positions the elevator means 19 correctly for article-retrieval at a desired compartment location, for example at the $Dd_2$ location in FIG. 1B, this designation being understood to identify the second subdivision compartment in the fourth (d) shelf level of the D stack, for retrieval of a selected plurality of like jar packages 20 in a single item-retrieval cycle of receprocation.

As in said Castaldi U. S. Pat. No. 3,490,616, each of the various compartments is identified by a differently characterized version of the same digital code, applied as by pressure-sensitive adhesive label techniques to a forwardly exposed edge of the compartment, as at edges of shelves 11. Such labels (21) are placed at corresponding offsets from the compartments which they identify, and the drive mechanism for the carriage and its elevator functions until character-scanning mechanism on the carriage and elevator eventually recognizes a preselected digitally identified location.

In FIGS. 2, 3 and 4, the carriage 18 is seen to comprise a vertical guide column 25, secured at its lower end to a base frame 27 and at its upper end to another frame 28. The base frame 27 is a rectangular box of girders with means providing journalled support of two drive and support rolls 29–29' riding spaced locations of a single rail 30, which will be understood to extend the full length of the storage matrix of FIG. 1; rolls 29–29' are on drive shafts 31–31' synchronized by a sprocket connection 32. Lateral stability and alignment are provided by plural guide rolls 33 riding opposite sides of rail 30, at longitudinally spaced locations on base 27. The vertical column 25 is shown to comprise laterally spaced channel members 26 tied by spacers 34, and the rectangular upper frame 28 is also provided with spaced guide rolls 35, having edge-piloting engagement with opposite sides of an upper guide rail 36, directly above the main support rail 30. The elevator 19 is guided by rails or ways 37 on the outer surfaces of channels 26 and is vertically positioned by a carriage-mounted motor 38 and reduction-gear drive 39, to an endless chain 40; chain 40 is coursed over upper and lower sprockets 41–42 and over sprockets 43-44-45 at the point of connection to the reduction gear means 39. Another carriage-mounted motor 46 provides horizontal-drive power to rolls 29–29', via reduction gearing 47 and a sprocket connection 48 to the drive shaft 31'.

The elevator 19 is shown to comprise guide blocks 50–50' riding the ways 37 and mounted to a vertical side panel 51, extending between a lower platform 52 and an upper platform 53. Platforms 52–53 are vertically spaced to the extent of approximately twice the shelf-to-shelf height of a single article-storage compartment, thus enabling a basket or bin 54 to be removably placed on platform, and located as by blocks 54', for reception of articles removed from the shelf level of the compartment served by extractor mechanism 55 suspended from the upper platform 53.

Figure 5:
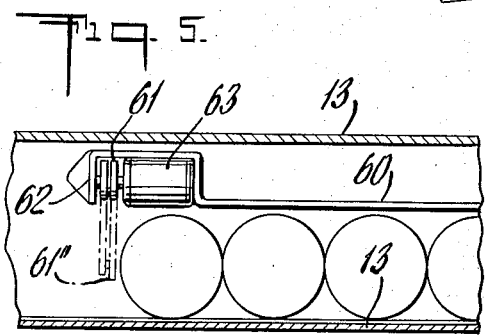
FIGS. 5 and 6 are similar simplified diagrams, to illustrate alternative article-extraction mechanisms.

Basically, the extractor mechanism 55 comprises an elongate arm 56 having horizontally guided suspension from platform 53 and having a cycle of reciprocation into and out of the compartment selected for article extraction; generally arm 56 must be long enough to extend all the way into such a storage compartment and still be adequately supported and guided from platform 53. As shown, reversible motor means 57 on platform 53 drives a pinion 58 engaged to a positioning rack 59 on one side of arm 56. A vertical plate 60 is suspended from arm 56, and article-engaging means 61 at the projected end of arm 56 (or its plate 60) is selectively positionable into and out of article-engaging position; the extreme inwardly projected position of these members is shown by phantom outlines 56'-60'-61' in FIG. 2. As shown in FIGS. 2 and 5, the article-engaging means is a plate or flap forming one arm of a four-bar (parallelogram) linkage, a flange 62 of plate 60 forming the opposite bar of the linkage; a rotary solenoid 63 is connected to drive one of the links, whereby plate 61 is retracted alongside solenoid 63 at all times, except when called upon to project to the article-engaging position 61'' shown in FIG. 5. It will be later explained how plate 61 is projected so as to engage the back side of the rearmost article in the array of articles in the selected compartment; it will also be explained how plate 61 is retracted out of article engagement at the instant when the preselected desired number of articles has been ejected by dropping (toppling) off the shelf into bin 54, thus leaving undesired articles in suitably advanced, more forward positions on the shelf 11 of the selected compartment.

Figure 6:
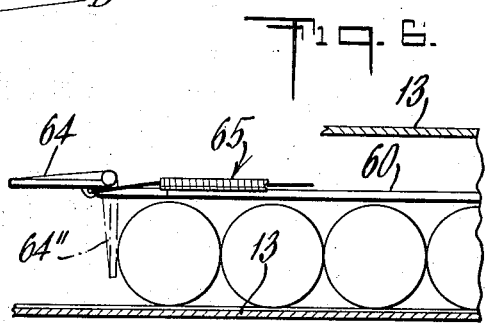

In the alternative form of FIG. 6, the extreme projected end of plate 60 is equipped with item-engaging means in the form of a flap or plate 64, hingedly connected to plate 60 on a vertical hinge axis and actuable, as by solenoid drive of bowden-wire means 65 to a crank arm of flap 64.

In both of FIGS. 5 and 6, the stored articles are designated by adjacent circles which are themselves adjacent one partition or divider wall 13 (12), and the plate 60 is positioned for adjacency and slight clearance with the other side of the array of articles. In the course of a retraction stroke of arm 56, plate 60 assures adequate container alignment in the course of outwardly displacing all articles, as will be understood.

In the form shown, sequencing of functions relies upon coordinated light sources and photocells, by way of illustrating certain mechanical-trip functions. A first such trip means, labeled X (see FIGS. 2, 7A and 7B) is carried by plate 60, in register with a striped pattern 66 of black and white, as provided by pressure-sensitive tape adhered to the elevator side wall 51; the light beam of this trip X will be understood to irradiate pattern 66, at least within the limited response alignment of the associated photocell, so that movement of arm 56 in a projecting stroke can develop an outward-bound count of stripes 66, for accurate count-down during the retraction stroke, returning arm 56 to its properly retracted position, whereupon motor 57 is stopped; alternatively, marks at 66 can be viewed as identifying merely the rearmost position to which arm 56 is to be retracted prior to disconnection of drive 57.

In another such synchronizing function, trip means Y is carried at the projected end of arm 56 and is so oriented as to respond to presence (or lack of presence) of an adjacent stored article, during the course of the projection stroke of arm 56. This is done by making the opposed partition-wall surface reflective, as by applying a pressure-sensitive strip of reflective tape along the partition wall 13, the same being suggested by legend in FIGS. 5 and 6. Thus, a light source at Y may irradiate a directly opposite region of wall 13 only if the wall is exposed (i.e., no stored article in the path of light) and the photocell at Y responds so strongly to reflection from the reflective tape, as compared to response from adjacent scanned articles (particularly for a slant incidence, as is preferred), that a clearly recognizable electrical-signal output is developed, upon arm 56 having been sufficiently inwardly projected to assure flap-actuating clearance back of the rearmost one of the arrayed articles. This signal output is used to set the flap 61 (64) into article-engaging position 61'' (64'').

In a third such synchronizing function, trip means Z is carried by the upper platform 53 of elevator 19. There, it is so oriented as to cast a light beam at the forward edge of the shelf 11 for the selected compartment, i.e., adjacent the retrieval-access plane common to all compartments. Along this edge, another reflective treatment (11') assures photocell response to the reflected light, as long as no article is being removed. Passage of each ejected article will momentarily interrupt the photocell response to light reflection, thus generating an electrical signal useful in counting the number of removed articles, it being noted that in the course of article removal each article topples from the supporting shelf with a sufficiently accelerating motion to assure the photocell a discrete response to the reflective treatment, between successively toppled articles. This count of articles is used to develop an electrical signal, upon match of the count to a preselection of the number to be counted, whereupon the signal is used to remove the article-engaging means (flap 61 or 64) from article-engaging position. Such removal occurs in the course of retracting arm 56 and calls for no interruption of the retraction stroke. The remaining articles are left in an array close to but sufficiently offset from the forward edge of the compartment shelf to permit exposure of reflective shelf treatment, for strong photocell response at Z, in readiness for the next article-counting cycle.

OPERATION

INsofar as elevator positioning is concerned, FIG. 8 is very schematic, since adquate description will be found in said Castaldi U. S. Pat. No. 3,490,616. Briefly coded data unique to the desired article (storage compartment) and to the desired number of articles is entered into buffer storage means 70 from console-controlled means such as push-button keys, or tape or card reader means, suggested at 71. The reader means is shown providing a start command in line 72 to the horizontal and vertical scanning and positioning means, using one or more photocell and light-source units (suggested at 73-73'-73'' in FIG. 4) carried by the carriage 18 and elevator 19, to enable scanning of edge-marked codes for coincidence recognition with stored data at 70; the functions of two-component (carriage-elevator) drive and character scanning are suggested at 74, providing an output to appropriate recognition circuits 75. Upon detection of complete two-component recognition (signifying elevator-borne extractor mechanism at the desired compartment), an output signal in line 76 is operative to initiate the extraction cycle, via extractor-control means 77.

The cycle-initiating signal from control means 77 is used in a first line 78 to relay means 79 to excite and thus drive motor 57 for the projecting stroke of arm 56. As this stroke proceeds, trip means Y is on the constant alert for detection of the back end of the array of scanned articles; its first response will be to generate a pulse at the beginning of the array of articles (as the response axis of trip Y passes the front edge of the reflectively treated wall 13), and this will be followed by a second pulse at the end of the array. A "Count 2" counter 80 responds to the second such pulse to develop a "Motor-stop" control pulse to relay 79, thus terminating the projection stroke and causing a control output signal in line 81 to the actuator 82 for the article-engaging flap 61 (64). Once the flap is so actuated, a control signal in line 83 is operative upon a second relay 84 to drive motor 57 for the retraction stroke of arm 56, and in the course of such stroke one or more articles are ejected, by toppling, as previously explained.

The number of toppled articles is observed by trip means Z, until matched with the preselected number "N," such "quantity" informaiton being supplied to counter means 85 by a suitable buffer-storage connection. Upon detection of achievement of the preselected count, an output signal from counter 85 to actuator 82 is effective to remove the flap from article-engagement, thus leaving remaining articles on the shelf while allowing the arm-retraction stroke to proceed to completion.

During the course of the indicated projection and retraction strokes, trip means X has also been operative. The stroke-initiation signal from control means 77 was operative in line 86 to set the correct polarity (direction) of a relay (e.g., D.P.D.T.) 87, so that pulses from trip means X are fed to an "IN" counter 88 for storage at 89, the full extent of the actual projection stroke being thus registered at 89. Thereafter, upon flap actuation, the motor-reversing signal in line 83 was also supplied in line 90 to reverse the polarity of relay 87, thus conditioning X-developed pulses for delivery to an "OUT" counter 91, for storage at 92. A coincidence circuit 93 observes storage circuits until they match, whereby a motor-stop signal is generated in line 94 to disable the motor relay 84, thus terminating the retraction stroke.

Having thus completed the retrieval of the desired number of articles at the preselected compartment, this fact may be recorded by using the signal in line 94 to (a) reset the extractor control, via line 95, and (b) to trip the print mechanism 96 of, say, a billing or shipping document; the mechanism 96 will be understood to enter a printed line for the number and description of the extracted articles, relying upon suitable informaton amplifiers 97 supplied with compartment-coordinate data in line 98 from the two-coordinate positioning means 74. An output line 99 from the printer 96 provides a recycling pulse, as to the card-reader input 99', for commencement of a similar cycle of two-coordinate search and third-coordinate retrieval of preselected (and possibly different numbers of) other articles, at a different compartment location.

Having thus recycled until completion of order data at the reader 71, the completion of the last-filled item in the order will be recognized at reader 71, upon receipt of the last retrieval "completion" pulse at input 99'. Such recognition at 71 will be understood to develop an output signal to suitable means 100 connected to positioning means 74 to govern return of the carriage and elevator to operator access, alongside the console 16, as suggested by heavy phantom outline 19' in FIG. 1.

It will be seen that the described apparatus assurance all stated objects with basic simplicity and assuracne of programmed function. At any given preselected article-storage location, the single stroke of the retraction mechanism is automatically (a) limited only to the extent necessary to engage the most inwardly stored article, (b) effective to pick-off only the desired number of available articles, and (c) operative to leave all remaining articles in a forwardly advanced position in the compartment. Finally, having completed the automatically recycled pick-off of desired numbers of different articles, the carriage and elevator are returned to the operator console, where collected articles of a given order are all contained in the bin 54. Mere replacement with an empty bin 54 will enable the machine to be processing the next order while the previously collected materials are being packed for shipment.

While the invention has been described in detail for the preferred forms shown, it will be understood that modifications may be made without departure from the claims. For example, the divider walls 13 may be set at different and wider spacings, to accommodate wider articles to be removed; in such case, it will be appreciated that appropriate placement of the coded edge-markings 21 will cause the carriage and elevator to place the extractor mechanism correctly for automatic retrieval of the desired number of the larger articles.

What is claimed is:

1. Article storage and retrieval apparatus, comprising a frame including a multi-dimensional matrix of stationary storage compartments having open ends in essentially a single retrieval-access surface common to the compartments of said matrix, one of the dimensions of said matrix being vertical, each said compartment including means accommodating an aligned array of plural adjacent like articles, the array being aligned generally normal to said surface with an end article of each array positioned adjacent said surface, related multi-component guide means spanning said matrix adjacent said surface, retrieval-slide means guided by said guide means and means for selectively positioning said slide means adjacent a selected one of said compartments; item-retrieval means carried by said slide means and including selectively reciprocable means extendable generally normal to and through said surface and alongside arrayed articles in the selected compartment, the extent of such extension in the compartment being at least the full extent of the article array in the selected compartment, item-engaging means carried by said reciprocable means and movable to item-engaging position when at the said full-extent position of said reciprocable means, and means responsive to movement of said item engaging means to said item-engaging position for initiating a retraction stroke of said reciprocable means, whereby articles in said array are moved in unison toward said surface, successive articles at said surface being serially ejected from the selected compartment at said surface article receiving means for receiving such ejected articles.

2. Apparatus according to claim 1, in which said retrieval-slide means includes said article-receiving means positioned beneath the selected compartment and adapted to collect articles as they are ejected at said surface.

3. Apparatus according to claim 2, in which said article-receiving means is a selectively removable collection bin, detachably carried by said slide means.

4. Apparatus according to claim 1, in which said reciprocable means includes an extendable arm having guided support on said slide means.

5. Apparatus according to claim 4, in which said reciprocable means includes a reversible motor drive for extensibly positioning said arm.

6. Apparatus according to claim 1, including trip means carried by said slide means and responsive to passage of each ejected article to develop an electrical signal, means including a counter connected to said trip means and preselected for the number of articles to be retrieved from the array at the selected compartment, and counter-operated means connected to said item-engaging means for moving the same from item-engaging position upon a count of said number of electrical signals, whereby only said number of articles is ejected during the retraction stroke of said reciprocable means.

7. Apparatus according to claim 6, in which said trip means includes a light source producing a beam that crosses the path of articles ejected from the selected compartment, and a photocell responsive to article modulation of light from said beam.

8. Apparatus according to claim 7, in which the photocell and light source are both carried by said slide means, being positioned to illuminate that portion of the bottom of the selected compartment which is adjacent said surface, said bottom portion being sufficiently reflective in relation to reflection from each article as to generate an electric pulse in recognition of an article clearing said portion.

9. Apparatus according to claim 8, in which said portion is at least in part characterized by an applied light-reflective material.

10. Apparatus according to claim 1, in which said reciprocable means includes near its inwardly projected end an article-presence responsive probe generating an electrical signal in the course of the projection stroke and upon detection of clearing the most inwardly positioned article of the array in the selected compartment, said last-defined means being connected to actuate said item-engaging means to item-engaging position upon generation of said electrical signal.

11. Apparatus according to claim 10, in which said probe includes a light source producing a beam that crosses the compartment space allocated to article-array accommodation, whereby beam light can only cross said space behind the back end of the array in the selected compartment, a photocell positioned for response to beam light and generating an electrical signal indicative of inward-stroke displacement past the inward end of the array in the selected compartment, and means operatively connected to said photocell for terminating the inward stroke upon generation of said signal.

12. Apparatus according to claim 11, in which a wall of the selected compartment is light reflective at least on an alignment longitudinally of and adjacent the said article-accommodation space, said photocell and light source being both carried by said reciprocable means and being so positioned with respect to said reflective wall that the arrayed-article space is between said wall and said photocell.

13. Automatic article storage and retrieval apparatus, comprising a frame including a two-dimensional matrix of stationary storage compartments having open ends in essentially a single horizontally and vertically extending retrieval access surface common to the compartments of said matrix, each said compartment including means accommodating an aligned array of plural adjacent like articles, the array being aligned generally normal to said surface with an end article of each array positioned adjacent one side of said surface, a digitalized character identification unique to each compartment and externally exposed substantially at said surface, said character identifications being in corresponding areas of all compartments in relation to said open ends, two-component retrieval means guided for movement adjacent the other side of said surface and including an item-retrieval device positionable in item-retrieval relation with articles in a selected compartment; drive means for two-component traversal of said device over the ends of said compartments, said device including character-scanning means, a compartment-digit selector, and coincidence-detecting means in controlling relation with said drive means and connected to said scanning means and selector for generation of an electrical signal upon scan recognition of a selected compartment digit, said connection being such as to stop said traversal upon selected-compartment positioning of said device; said device including selectively reciprocable means extendable generally normal to and through said surface and alongside arrayed articles in the selected compartment, item-engaging means carried by said reciprocable means and movable to item-engaging position when at the said full-extent position of said extendable means, means responsive to movement to said item-engaging position for initiating a retraction stroke of said reciprocable means, and trip means responsive to passage of each ejected article to develop an electrical signal; means including a counter connected to said trip means and preselected for the number of articles to be retrieved from the array at the selected compartment, and counter-operated means connected to said item-engaging means for moving the same from item-engaging position upon a count of said number of electrical signals.

14. Apparatus according to claim 13, in which said reciprocable means is operable in a cycle of projection into and withdrawal from the selected compartment, said reciprocable means including actuating means operative to initiate such cycle upon detection of coincidence by said coincidence-detecting means.

15. An article of manufacture, for use as item-retrieval mechanism in a storage and retrieval system wherein a two-component positioning mechanism is operative to place an article-retrieval deck alongside the open end of a predetermined article-storage compartment in a two-dimensional matrix of such compartments wherein corresponding open ends of the compartments are in essentially a single article-retrieval surface, an arm and guide means therefor with means for mounting the same to such deck in an orientation to permit guided arm reciprocation through said surface and into a selected compartment, actuating means producing a cycle of projection and retraction of said arm, article-engaging means carried on a projected part of said arm and actuable into and out of article-engaging position, article-presence detecting means carried on a projected part of said arm and generating an electrical signal upon detection of the inner end of an array of articles in the compartment, means responding to said signal for extending said engaging means into article-engaging position and for halting the projection stroke and initiating a return stroke of said cycle, ejected-article counting means including means producing an electrical-signal output upon count of a preselected number of articles to be retrieved, and means connected to said last-mentioned means and operative during the retraction stroke to move said article-engaging means from article-engaging position; whereby in a single two-stroke cycle of said arm, only the selected number of items will be withdrawn from storage at the selected compartment.

16. The apparatus of claim 13, including program means for recycled control of drive means and of said reciprocable means to and at a succession different storage compartments, whereby different numbers of different articles may be retrieved from storage in accordance with the program of said program means.

17. The apparatus of claim 16, in which said program means includes means operative upon completed retrieval of all items required by the current program thereof to return said carriage and elevator to a predetermined operator-access location.

18. The apparatus of claim 17, in which operator-control means for said apparatus is at one end of said frame, and in which said operator-access location is adjacent said operator-control means.

* * * * *